United States Patent
Dickgiesser et al.

(10) Patent No.: US 8,660,989 B2
(45) Date of Patent: Feb. 25, 2014

(54) GENERIC FRAMEWORK FOR APPLICATION SPECIFIC DATA EXCHANGE

(75) Inventors: Klaus Dickgiesser, Karlsruhe (DE); Aditya Kapoor, Walldorf (DE); Kristian Kraljic, Bad Schoenborn (DE); Stefan Vormbrock, Wiesbaden (DE)

(73) Assignee: SAP AG, Walldorf (DE)

( * ) Notice: Subject to any disclaimer, the term of this patent is extended or adjusted under 35 U.S.C. 154(b) by 205 days.

(21) Appl. No.: 12/870,672

(22) Filed: Aug. 27, 2010

(65) Prior Publication Data
US 2012/0054153 A1   Mar. 1, 2012

(51) Int. Cl.
*G06F 7/00* (2006.01)
*G06F 17/00* (2006.01)

(52) U.S. Cl.
USPC .......................................... 707/623

(58) Field of Classification Search
USPC ........................... 707/623, 999.204
See application file for complete search history.

(56) References Cited

U.S. PATENT DOCUMENTS

| | | | |
|---|---|---|---|
| 6,202,067 B1 * | 3/2001 | Blood et al. | 707/613 |
| 7,617,369 B1 * | 11/2009 | Bezbaruah et al. | 711/162 |
| 2003/0041074 A1 * | 2/2003 | Vasudevan et al. | 707/204 |
| 2003/0046274 A1 * | 3/2003 | Erickson et al. | 707/3 |
| 2007/0244940 A1 * | 10/2007 | Devarakonda et al. | 707/205 |

* cited by examiner

*Primary Examiner* — Aleksandr Kerzhner
(74) *Attorney, Agent, or Firm* — Schwegman Lundberg & Woessner, P.A.

(57) ABSTRACT

Systems and methods to provide a generic framework for application specific data exchange are shown. In example embodiments a data container is received. The data container includes data saved to a master data system. The data container is buffered. At least one backup data system is determined based on attributes of the data container. A determination is made as to whether the at least one backup data system is available. When the at least one backup data system is available, the data container is forwarded to the at least one backup data system.

19 Claims, 9 Drawing Sheets

```xml
<xml version="1.0" encoding="utf-8" ?>
<n0:MT_CRM_ReplicationMessage xmlns:n0="urn:crm.service.sap.com"
Xmlns:prx="urn:sap.com:proxy:BCP:/1SAI/TAS000000000:700:2008/06/25">
<ObjectGuid>DF8FB1506F7BC4F1A05B00163353CC180</ObjectGuid>
<ObjectID>5000247168</ObjectID>
<Description>Trigger CRM Synchronization</Description>
<Priority>3</Priority>
<ChangedAt>20100715093714</ChangedAt>
<ProcessType>ZBJ1</ProcessType>
<SubType>VALUE 01ZBJ1 </SubType>
<Customer>0000000000</Customer>
<Content>PD94bWwgdmVyc3lvbi0iMS4wiMS4IiBlnfCnfsGds0dSTo3lwfwwS234j
sSTs41GDdn24DT52wwdlhDYstw6dg&Dfj+rh35gfhaGYX453gh053H2ydy6fGD53
```

GENERIC FRAMEWORK FOR APPLICATION SPECIFIC DATA EXCHANGE

FIELD

The present disclosure relates generally to data processing, and in a specific example embodiment, to a generic framework for application specific data exchange.

BACKGROUND

Readily available access to data is important in many cases. For example, a customer relationship management (CRM) system may need to be available 24 hours a day, seven days a week. As such, a single system may not be sufficient to manage the data. Should one system have problems or have a scheduled downtime, a second system or backup system is needed to allow access to the data.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for providing a generic framework for application specific data exchange are provided. In example embodiments, a data container is received from a master data system (e.g., production system) at an integration system. The data container includes data saved by the master data system. The data may be new data or changes made to existing data that is saved to the master data system. The content of the data container is irrelevant. Due to the generic framework, any type of data may be handled. Routing rules maintained at the integration system and customized interfaces and mappings stored at business systems (e.g., production data systems and backup data systems) allow for the handling of any type of data as well as for integrating and synchronizing between heterogeneous application and data systems. The generic framework is not restricted to the integration system, which is used as a transport mechanism. The "generic" part of the framework also includes all involved business systems (e.g., master data system and backup data systems).

When the data is saved by the master data system, a data container is sent to the integration system. Depending on an interface name, the receiver system(s) (e.g., backup data system) for the data containers are determined in the integration system. In addition, the integration system is able to determine the receiver system(s) using the attributes and attribute values of the data container and forward the message to the receiver systems. This procedure is known as content based routing.

When the data is received in the integration system, the data container is buffered. Then, asynchronously, the receiver systems for the data container are determined as discussed above. In case the receiver systems are unavailable, the data contain will be sent to a particular receiver system as soon as the receiver system is available becomes available.

Figure 1:
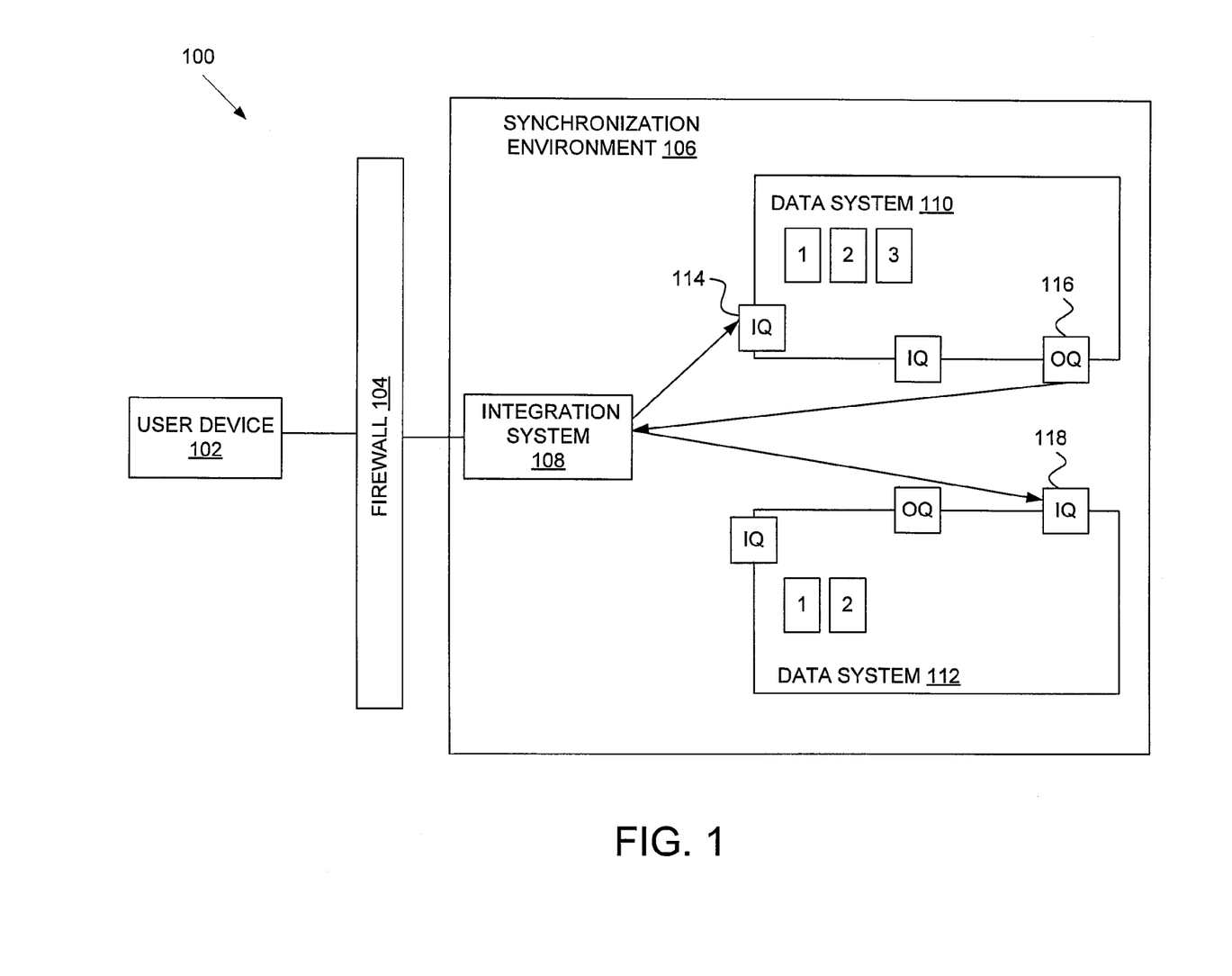
FIG. 1 is a block diagram illustrating an example of an environment in which example embodiments may be deployed.

With reference to FIG. 1, an embodiment of an environment 100, in which example embodiments of the present invention may be deployed, is shown. A user device 102 is communicatively coupled via a firewall 104 to a synchronization environment 106. A user at the user device 102 may provide data to, and access data from, the synchronization environment 106. The user device 102 may be coupled via any one or more of a local or wide area network (e.g., the Internet).

The synchronization environment 106 may comprise an integration system 108, which manages the synchronization of data between a first data system 110 and a second data system 112. In an example embodiment, the first data system 110 is a master or production data system. The master data system is a primary data system which may be accessed by the user device 102. For example, a customer service agent using the user device 102 may access a CRM system (e.g., the first data system 110). The customer service agent may access, edit, and input data into the first data system 110. In example embodiments, the data is transmitted through the integration system 108, which logs the receipt of the data and forwards the data to an input queue 114 of the first data system 110. The data (illustrated as item 3) is then stored at the first data system 110.

Once stored, the data may then be packaged into data containers by the first data system 110 for synchronization. In example embodiments, a data container may comprise any data (e.g., text, attributes, attachments) and be structured or unstructured information. For example, in a CRM environment, the data container may include service orders, billing order, or customer-specific information (e.g., address, payment information, sizing information, etc.). In one embodiment, the data container is packed in XML format. Alternative embodiments may use binary, ascii, or any other format for structured and unstructured data. The format is irrelevant as long as handlers (discussed further below) that pack and unpack the data containers know the proper format.

The data containers are then sent via an output queue 116 of the first data system 110. From the output queue 116, the data is transmitted through the integration system 108 to an input queue 118 of the second data system 112. The integration system 108 also logs this second transmission of information. In this example embodiment, the second data system 112 operates as a backup data system. As such, any data that is stored to the first data system 110 will also be stored to the second data system 112.

Figure 2:
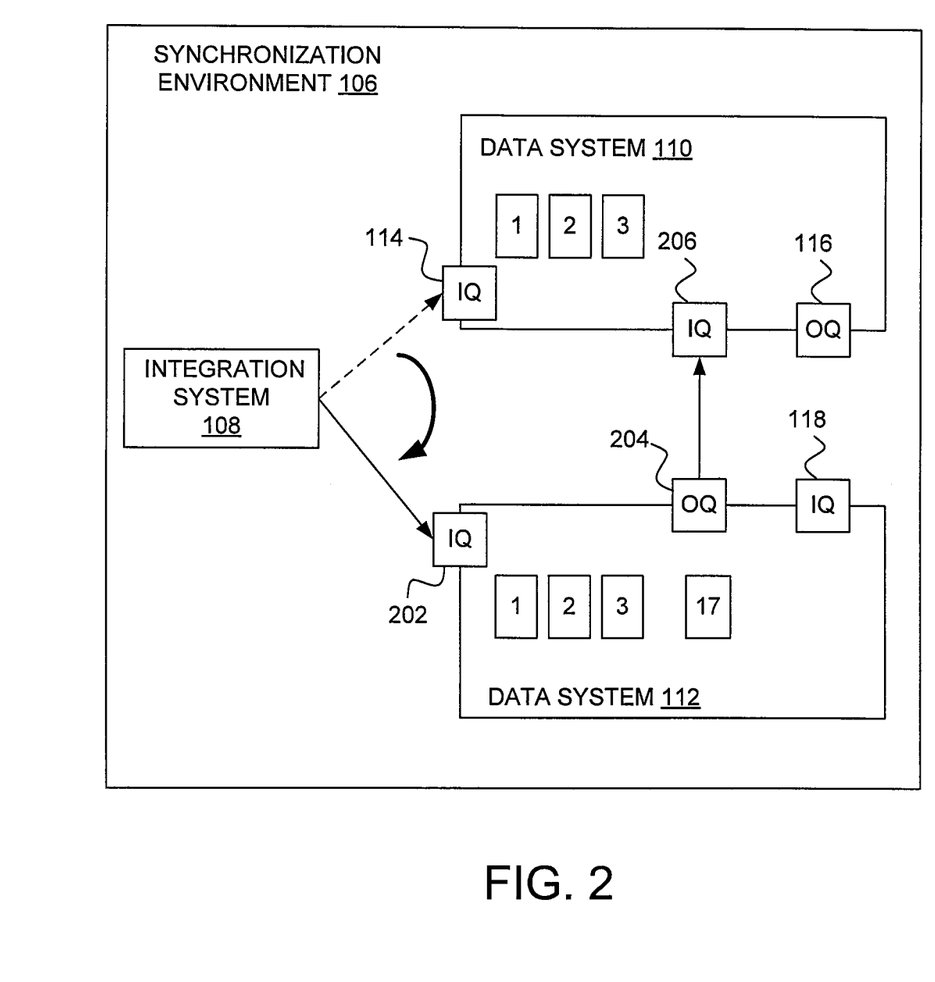
FIG. 2 is a block diagram illustrating the example embodiment switching system roles.

Referring now to FIG. 2, the example embodiment of FIG. 1 is shown with a switch in system roles. That is, the second data system 112 is now the master or production data system. In one example, the first data system 110 may be switched to a backup data system. In another example, the first data system 110 may be taken down for maintenance or for other reasons. When the first data system 110 is not available, an end user is switched to the backup data system, which has the same features and functions as the master data system. As a result, the end user does not notice that they are working in a different system than before.

As shown, any data that is directed to the master data system is now routed to an input queue 202 of the second data system 112 by the integration system 108. The second data system 112 stores the data (illustrated as item 17). The data may then be packaged for synchronization and sent to an output queue 204. From the output queue 204, the data is sent via the integration system 108 to an input queue 206 of the first data system 110 when the first data system 110 is available.

The integration system 108 and an example data system (e.g., data system 110) will be described in more detail in connection with FIG. 3 and FIG. 4, respectively. While only one integration system 108 and two data systems (110 and 112) are shown in FIG. 1 and FIG. 2, it is noted that more than one integration system 108 and any number of data systems may be utilized in the synchronization environment 106. For example, two backup data systems may be provided in order to have triple redundancy. In an alternative example, several backup data systems may be provided whereby each backup data system contains a duplicate of a portion of the master data system. In this example, each backup data system may be selected for receipt of a data container based on the content of the data container.

Figure 3:
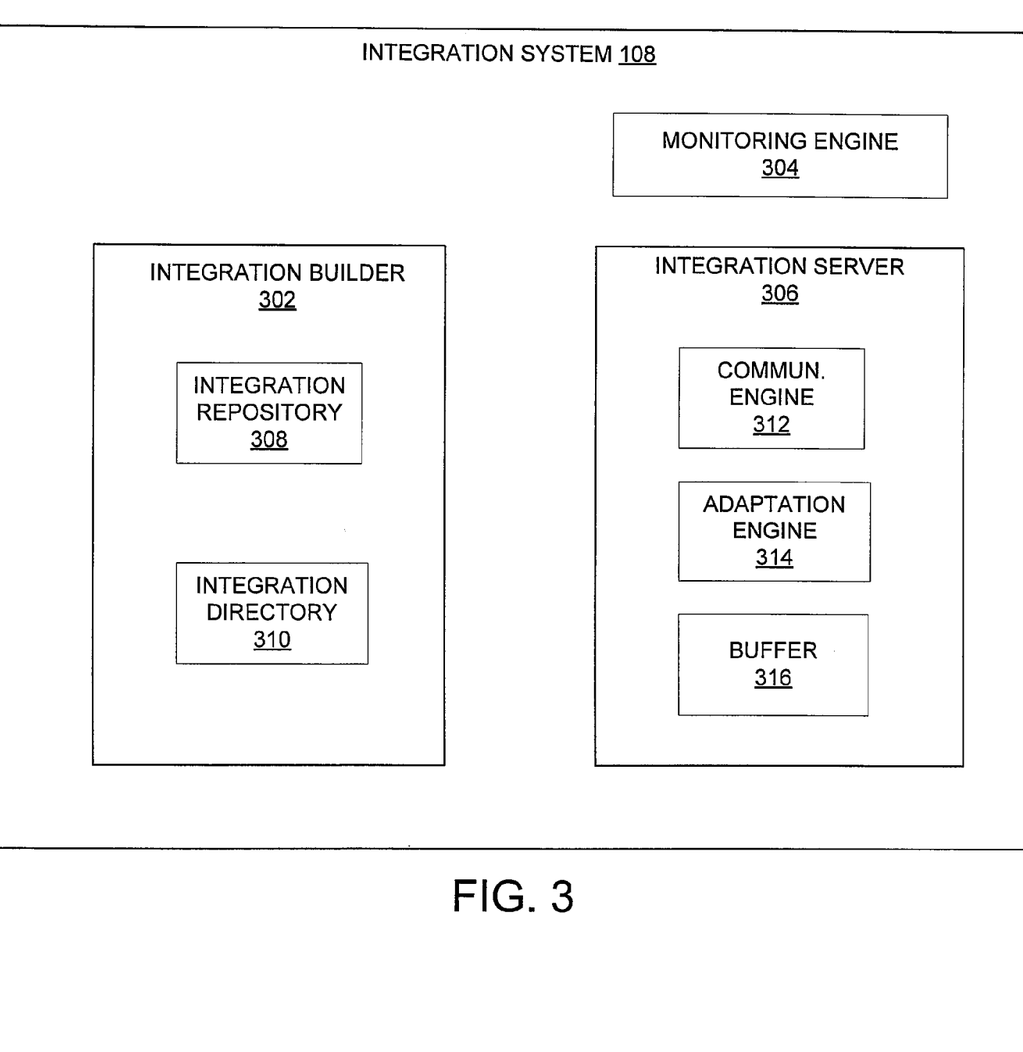
FIG. 3 is a block diagram of an integration system.

FIG. 3 is a block diagram of the example integration system 108. The integration system 108 mediates between entities with varying requirements such as in connectivity, format, and protocols. The integration system 108 may comprise an integration builder 302, a monitoring engine 304, and an integration server 306. It is noted that the integration system 108 may comprise other components (not illustrated) not essential to operations of example embodiments of the present invention.

The integration builder 302 is part of a generic framework and is used for transferring data containers between the data systems (e.g., data systems 110 and 112). The integration builder 302 is coupled to the synchronization environment 106. The integration builder 302 comprises an integration repository 308 and an integration directory 310. It is noted that the generic framework is not restricted to the integration system 108. The generic framework includes logic for using generic data containers for the data transfer, customizing for inbound handling and outbound handling, customizing of the interfaces used in the integration system 108, and including new application data into the generic framework with only enhancements in the customizing of the generic framework with no changes or enhancements in the generic framework, itself.

The integration repository 308 provides a common, central repository for data structures and interfaces and is used to design and develop the interfaces and the definition of the interface names. Interfaces may define a data format of the messages that are exchanged between different application components. Additionally, properties of the interfaces may determine whether communication may take place synchronously or asynchronously. The integration repository 308 contains static objects which can be used for different scenarios by defining routing rules in the integration directory 310. Integration definitions are maintained in the integration repository 308 separate from any functional application coding. As a result, a user can upgrade functional coding without affecting the repository definitions.

The integration directory 310 manages information relevant to a specific IT environment and uses the information to drive the integration system 108. The integration directory 310 contains dynamic objects (e.g., routing rules, active services, executable mapping) that configure scenarios using the objects from the integration repository 308 by adding configuration-specific information. Thus, for example, the dynamic objects indicate how to route messages and data between systems (e.g., the data systems 110 and 112).

The monitoring engine 304 is configured to monitor message (e.g., data container) flow. In example embodiments, the monitoring engine 304 logs each message sent to the master data system, as well as each message sent to the backup data system. The content of the containers are irrelevant to the monitoring engine 304.

The integration server 306 facilitates interaction between diverse systems and applications across internal and external network computing systems. In one embodiment, integration may be achieved by exchanging XML-based message objects through the integration server 306. To adapt to different application systems, the integration server 306 may wrap the data into a different data container and routes the data container using specific integration data from the integration directory 310 and the integration repository 308 and any system-specific data stored in a system landscape directory (not shown).

In example embodiments, the integration server 306 functions as a central distribution engine for messages (e.g., data containers) between the data systems. The integration server 306 may comprise a communication engine 312, an adaptation engine 314, and a buffer 316. It is noted that the integration server 306 may comprise other components (not illustrated) not essential to operations of example embodiments of the present invention. Additionally, the communication engine 312, adaptation engine 314, or buffer 316 may be located outside of the integration server 306 but be coupled thereto in alternative embodiments.

The communication engine 312 uses configuration data (e.g., dynamic objects) from the integration directory 310 to determine to which data system(s) to send the message and route the message to the data system(s). The communication engine 312 may also determine if a mapping needs to be executed prior to the transmission of the message.

The adaptation engine 314 processes messages that are exchanged between applications and systems in a heterogeneous system landscape. In example embodiments, the messages are in XML format. Using adapters of the adaptation engine 314, XML-based messages or HTTP-based messages may be converted to a particular message protocol and format required by the receiving data system. This allows for compatibility between heterogeneous systems.

In one embodiment, the message is a SOAP message having a SOAP header, a payload, and attachments. The SOAP header of the message contains information used by the integration server 306 to forward the message. The payload contains "business" data such as a purchase order. Any number of attachments may be included in the message. The attachments may comprise non-XML data (e.g., pictures, text documents, binary data). Applying the adapters of the adaptation engine 314, a protocol of the SOAP message may be adapted into a protocol applicable to a coupled system receiving the message.

The integration system 108 may work in synchronous modes and in asynchronous modes. When working in asynchronous modes, the incoming messages are processed, saved (e.g., buffered by the buffer 316), and forwarded. The receiving data system(s) for the message are then notified that the message is processed successfully and an attempt to forward the message to the receiving data system(s) as determined by the integration system 108 is made. In one case, the buffer 316 buffers the message upon receipt from the master data system. Further, the buffer 316 maintains the buffered message at the integration system 108 when the receiving data system is not available. For example, a data container message from the master data system may be buffered when the backup data system is shut down for maintenance or experiences a failure. In case the data system(s) is down, an attempt to transfer the message will be performed at a set period of time (e.g., every n minutes, where n can be customized). Once the backup data system becomes available, the message(s) stored in the buffer 316 are then sent to the inbound queue of the backup data system. Thus, the messages may be sent asynchronously to the backup data system. As such, this buffering process ensures that the message will be delivered to the receiving data system and no messages are lost.

It should be noted that if the integration system 108 should go down (e.g., system failure), asynchronous backup is still possible. In this instance, the messages may be buffered in the outbound queue of the master data system until the integration system 108 becomes available. Once the integration system 108 is available, the messages may be forwarded to the integration system 108 for synchronization with the backup data system.

Figure 4A:
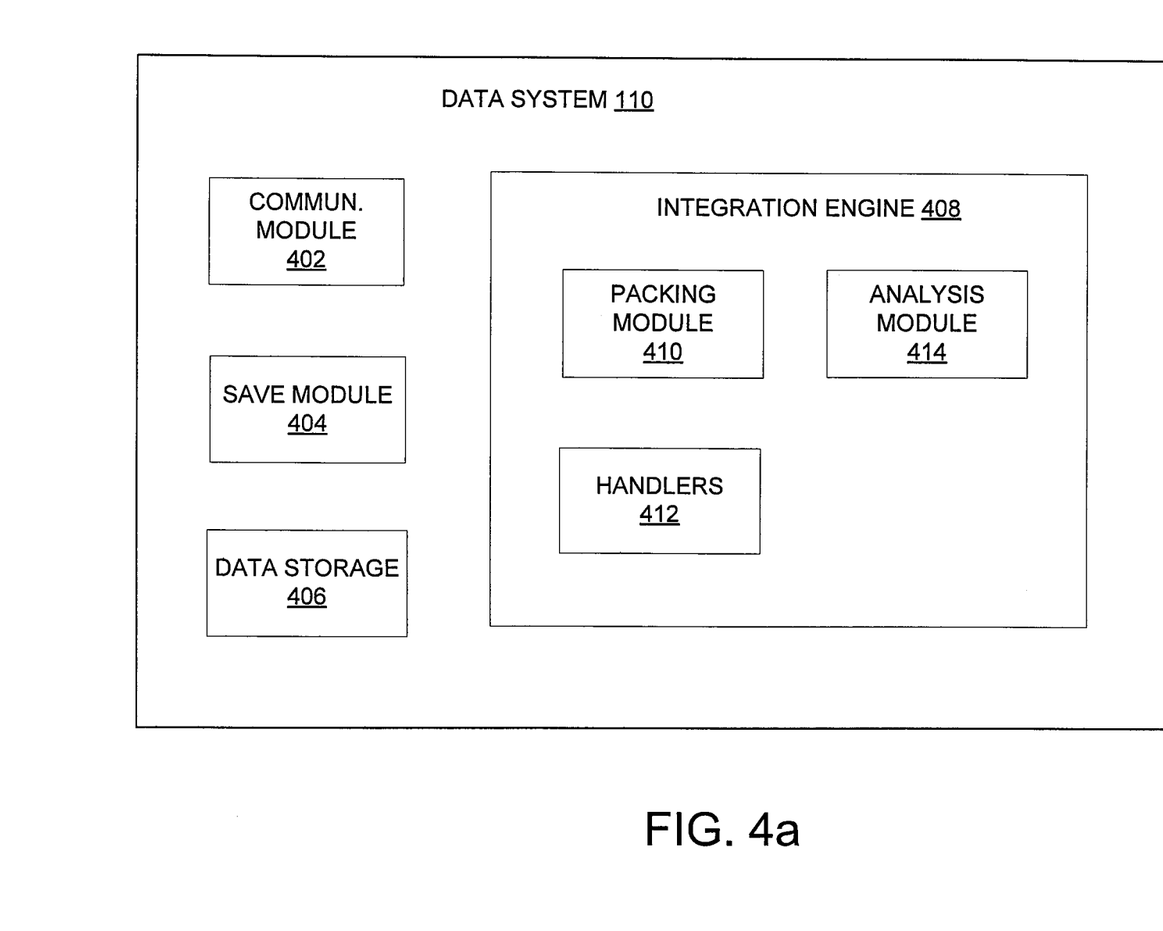
FIG. 4a is a block diagram of a data system.

FIG. 4a is a block diagram of the data system 110. The data system 110 comprises a communication module 402, a save module 404, a data storage 406, an integration engine 408. It is noted that the data system 110 may comprise other components (not illustrated) not essential to operations of example embodiments of the present invention.

The communication module 402 implements a message protocol of the integration system 108 when receiving and sending messages. In the process, the communication module 402 ensures that services that are defined by the protocol, such as quality of service and status management, are applied to the messages.

The save module 404 saves data to the data storage 406. While the data storage 406 is shown as being a part of the data system 110, alternatively, the data storage 406 may be located external to the data system 110 but coupled thereto.

In example embodiments, the saving of the data by the save module 404 automatically triggers the synchronization process at the master data system. A packing module 410 determines an object type of the data along with process type and subtype attributes (discussed in more detail below). Using the attributes, a particular handler from one or more handlers 412 is selected to pack the data into the data container. Each data container comprises a data structure that comprises attributes to identify the data container and a field "content" that contains the payload such as structured data (e.g., sales orders, service orders), unstructured data (e.g., file attachments), or a combination of structured and unstructured data. In one embodiment, the "content" is a raw string type that can contain any type of data in an XML format, but all other data formats are supported (e.g., binary, ascii).

The attributes of the data container may comprise an object GUID or ID field, a description field, a priority field, a process type and sub type fields, and a customer field. The object GUID or ID field may be used to define key fields of object that are created or updated in the data system 110. The objects may, in example embodiments, define a route to be used by the integration system 108 for routing the data container. The description field is used to describe the data container, while the priority field is used to define a processing order for different data container. The process type and subtype fields are used to identify which handler should be used to pack and unpack the content. Finally, the customer field may be used to identify a sender of the message (e.g., the master data system).

Figure 4B:
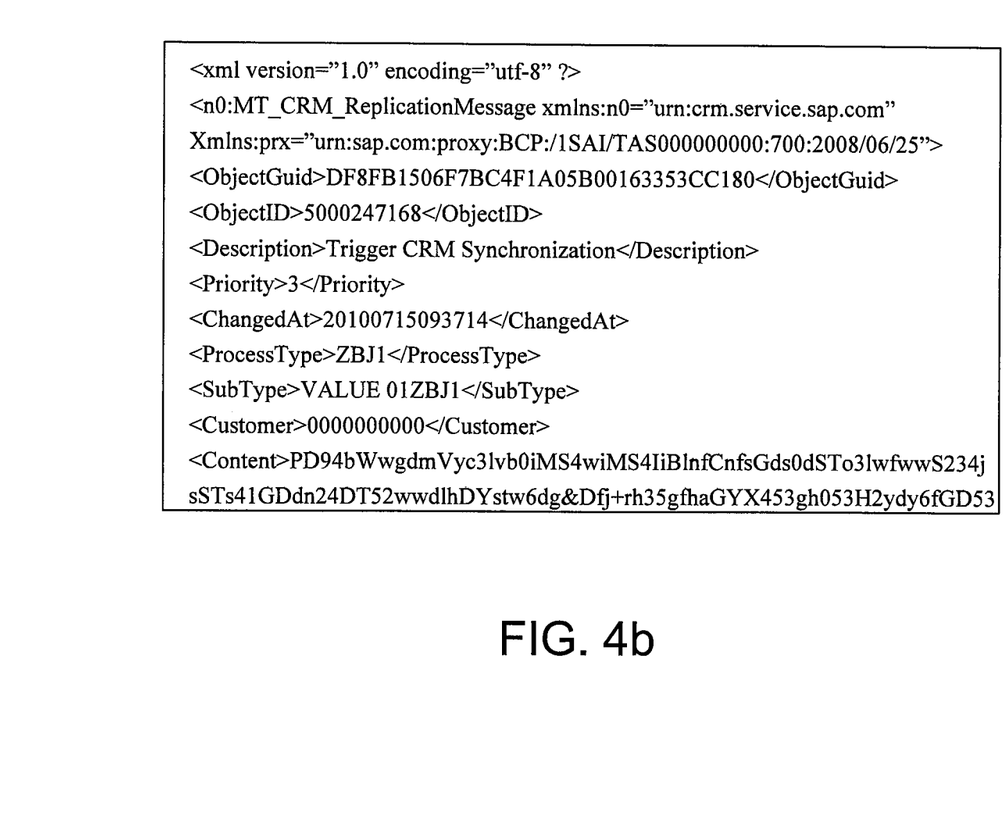
FIG. 4b is an example illustrating attributes and attribute values of a data container of the generic framework.

A working example illustrating attributes is shown in FIG. 4b. In an example embodiment, an interface name "MT_CRM_ReplicationMessage" is used for the receiver determination (e.g., to which data system the data container should be sent). Additionally, any of the other attributes of the message can be used for receiver determination procedures as well. It is noted that generally the following fields are important for the data-transfer: unique identifiers which are known across all data-systems, a date/timestamp when the message was sent or forwarded, and further information about the sender and receiver systems.

Referring back to FIG. 4a, an analysis module 414 of the integration engine 408 analyzes attributes of received data containers when the data system 110 operates as a backup data system. Based on the attributes, a particular handler of the one or more handlers 412 is determined by the analysis module 414. The particular handler may then be used to unpack the received data container. The processes for packing, transmitting, and unpacking data containers is described in more detail in connection with FIG. 5-FIG. 7 below.

Figure 5:
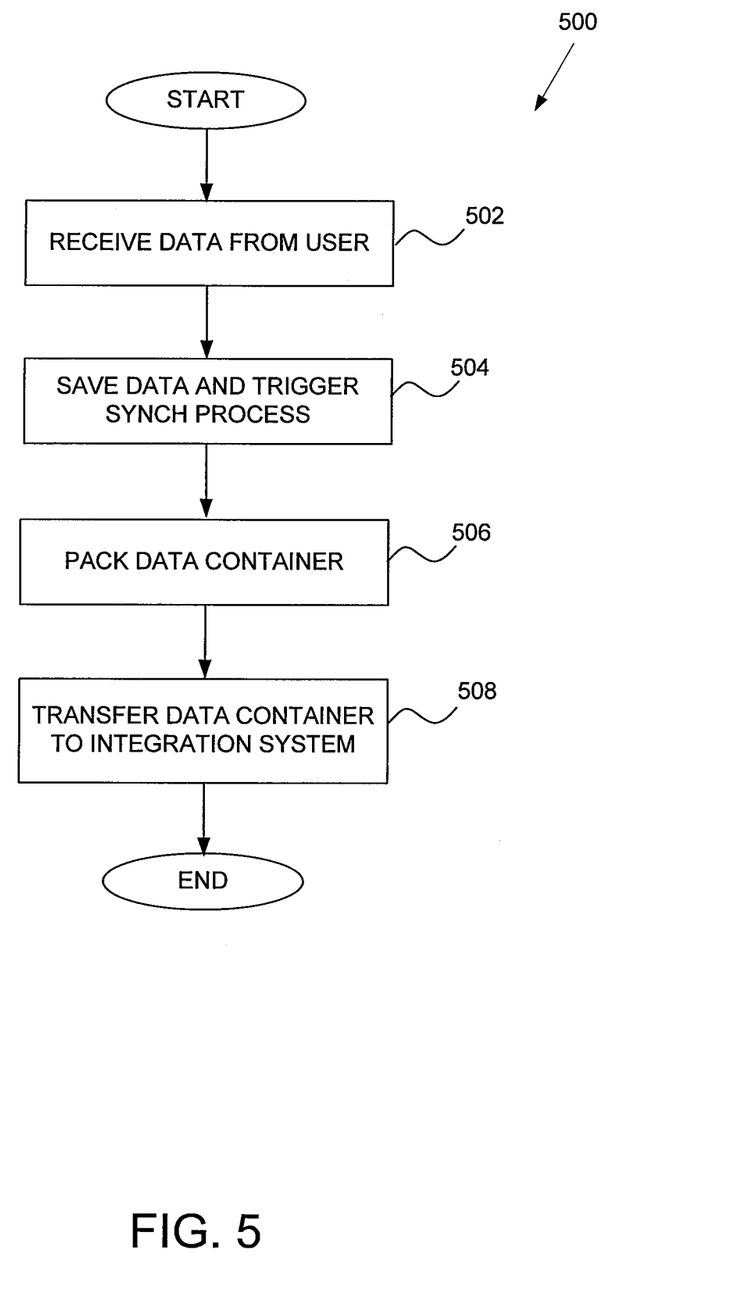
FIG. 5 is a flowchart of an example method to process data at a master data system.

FIG. 5 is a flowchart of an example method 500 to process data at a master data system. At operation 502, data is received from a user at the user device 102. The data may be received via the integration system 108 into an inbound queue (e.g., input queue 114) of a master data system (e.g., data system 110). In example embodiments, a load-balancer URL is used by an end user to assess and exchange data with the data system. The load-balancer URL indicates to the integration system 108 to which data system to forward new or changed data. By using the load-balancer URL, the master data system may be switched without any interruption to the end user. A log of the transmission to the master data system may be recorded by the monitoring engine 304. Alternatively, data may be modified at the master data system and saved.

Upon saving the data (e.g., new or modified data), the synchronization process is automatically triggered at operation 504. In example embodiments, the integration system 108 uses a generic framework for the synchronization of the data. In the generic framework, a superclass may be implemented to define methods and interfaces that are used to handle (e.g., pack, unpack, and save) the data and to transfer the data container to the proper integration system 108. Each content type (e.g., sales order, service order, etc.) has a defined class implementation. Each class inherits its method and attributes from the superclass. As a result, only methods for packing, unpacking, and saving the data are reimplemented in accordance with example embodiments. The system customizing of the generic framework decides which handler (e.g., of the handlers 412) should be used for which type of data container. During customization, for each type of data container, an outbound class and inbound class is listed. Methods of each class are already defined by the master class or superclass (e.g., GET_DATA and SET_DATA) which is inherited by the outbound and inbound class. When the data is saved, a key of a changed object and the object type (e.g., ERP sales order, CRM service order) is transferred to the synchronization framework (e.g., the integration system 108) by the save module 404.

The data is packed into a data container in operation 506. Based on the process type and subtype attributes, a particular handler 412 executes the packing of the data container. Once packed, the data container is forwarded to the integration system 108 in operation 508. In example embodiments, the data container is sent from an outbound queue (e.g., output queue 116) of the master data system (data system 110).

Figure 6:
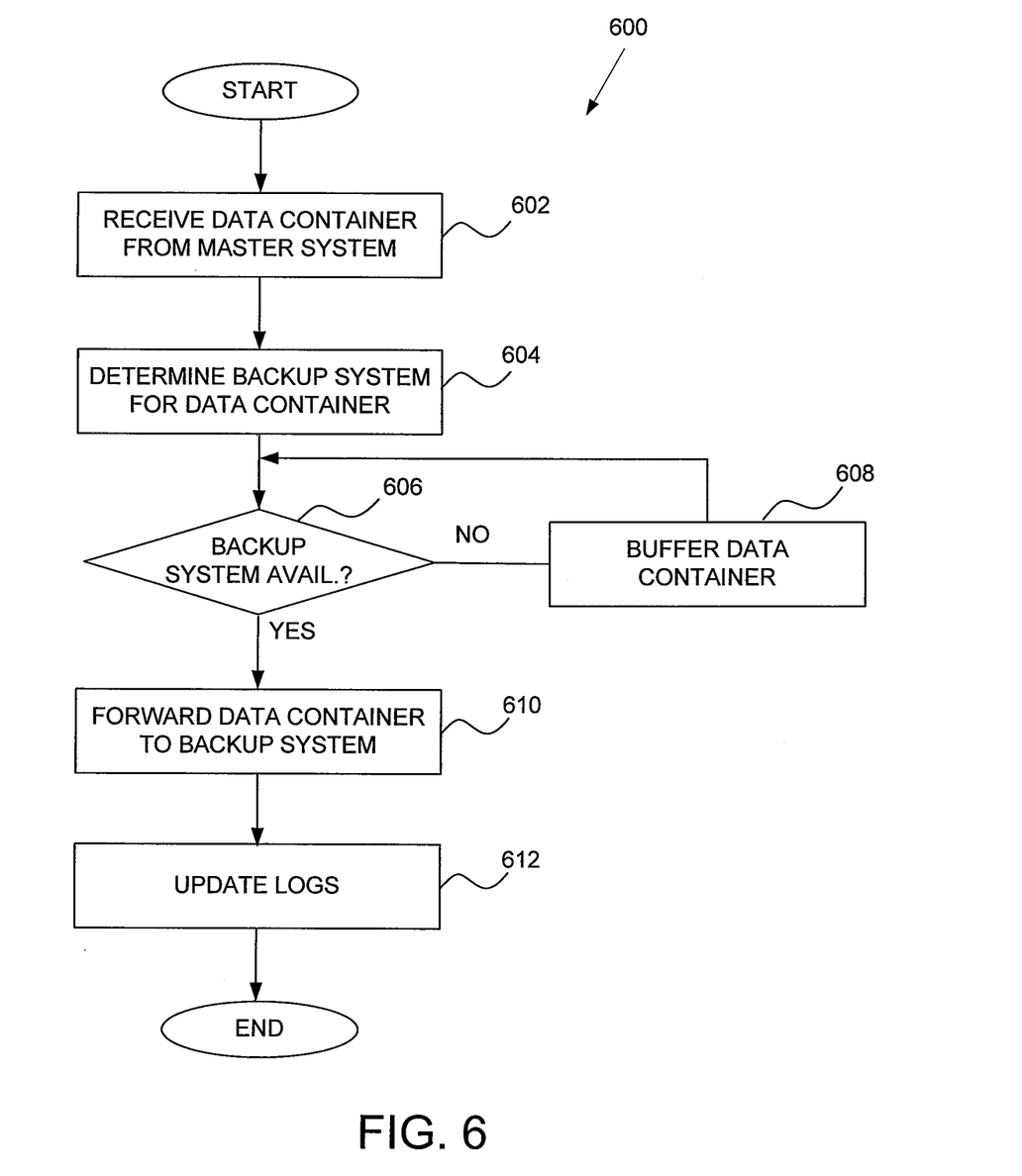
FIG. 6 is a flowchart of an example method to manage data synchronization at the integration system.

FIG. 6 is a flowchart of an example method 600 to manage data synchronization at the integration system 108. At operation 602, the data container is received from the outbound queue of the master data system. The backup data system is determined for the data container in operation 604. In example embodiments, the integration system 108 uses content-based routing. Content-based routing allows the data container to be routed to one or more backup data systems depending on the values of the data container attributes.

At operation 606 a determination is made as to whether the backup data system is available. If the backup data system is not available, the data container is buffered in operation 608. When the backup data system does become available, the data container is forwarded in operation 610. It is also noted that the master data system may be shut down even if all data containers are not synchronized (e.g., data containers buffered at the integration system 108). It is further noted that in some embodiments, the data container is automatically buffered when received from the master system in operation 602 and operation 608 maintains the data container in the buffer.

A log is then recorded of the data container transmission to the backup data system in operation 612. The monitoring engine 304 logs the transmission. By monitoring the logs for each set of data transmitted to the master data system and the logs of each data container forwarded to a backup data system, the monitoring engine 304 can insure that the master data system and the backup data system are synchronized.

Figure 7:
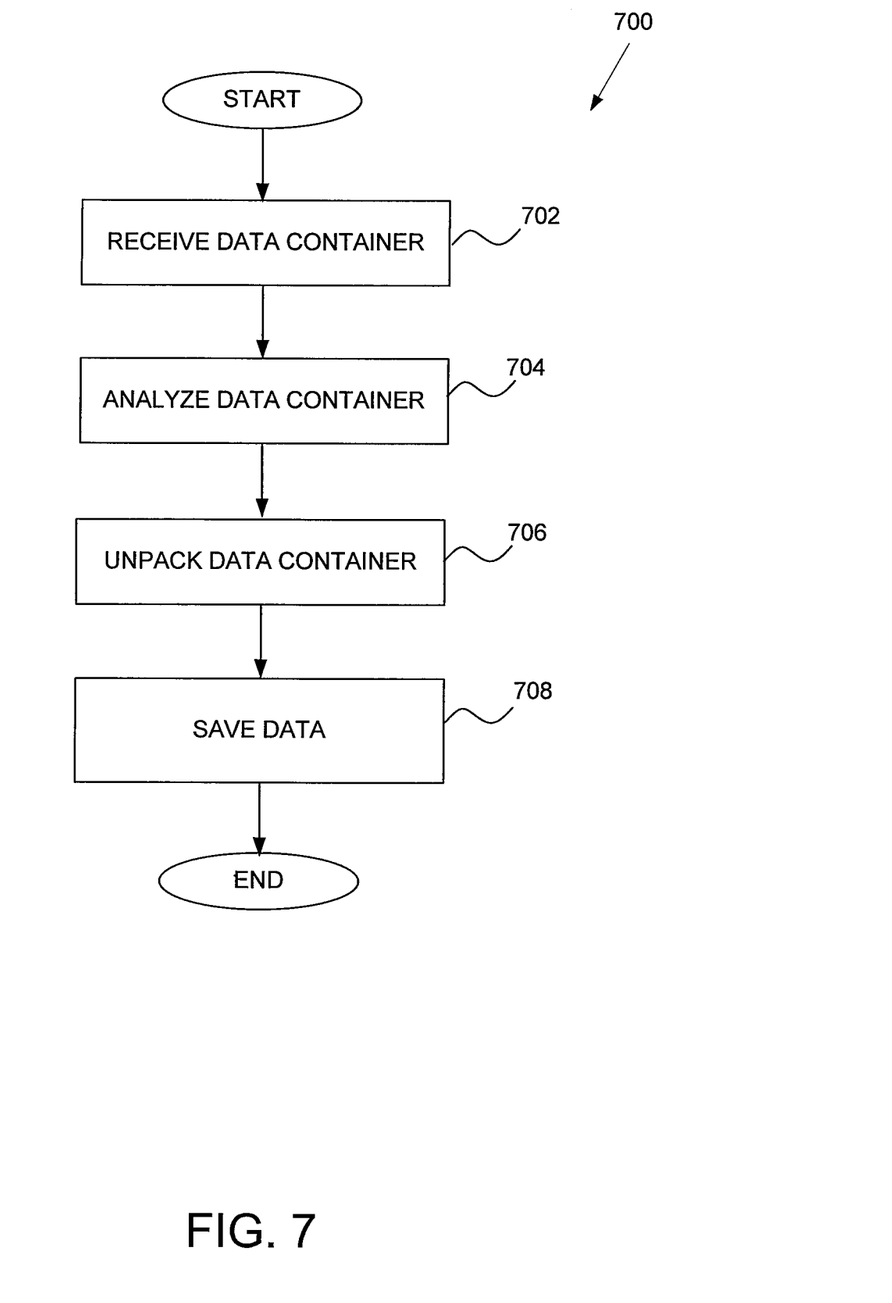
FIG. 7 is a flowchart of an example method to process a data container at a backup data system.

FIG. 7 is a flowchart of an example method 700 to process the data container at a backup system (e.g., second data system 112). At operation 702, the data container is received. In example embodiments, the data container is received from the integration system 108 via an inbound queue.

The data container is analyzed by the analysis module 414 in operation 704. The analysis module 414 determines attributes of the received data containers, and in particular the process type and subtype attributes. Based on the process type and subtype attributes, a particular handler is determined for unpacking the data container. The particular handler may then be used to unpack and process the received data container in operation 706.

Once unpacked, the data may be saved in operation 708. In example embodiments, the data is saved with the same attributes and identifiers as in the source system (i.e., the master data system).

By using the generic framework, any type of data may be kept synchronized between two or more data systems and the data may be synchronized asynchronously. Furthermore, the generic framework allows new data scenarios for new processes or applications (e.g., new billing orders, sales order) to be quickly and easily set up without coding changes or coding enhancements required in the framework. Specifically, attributes of a class or superclass may be created or altered to accommodate the new data scenarios. For example, payment information for a customer may be saved by a company that created a particular sales order. The payment information may be synchronized between the data systems by adding a new entry into a table of synchronization objects in the integration system 108 to introduce the new data container to the framework. When the sales order is saved, a particular handler is called to process the data for the payment information. Thus, by creating a new customizing entry for the new data scenario, the new data scenarios may be accommodated without having to define new interfaces or new routing rules (e.g., when the source and receiving data systems are the same).

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
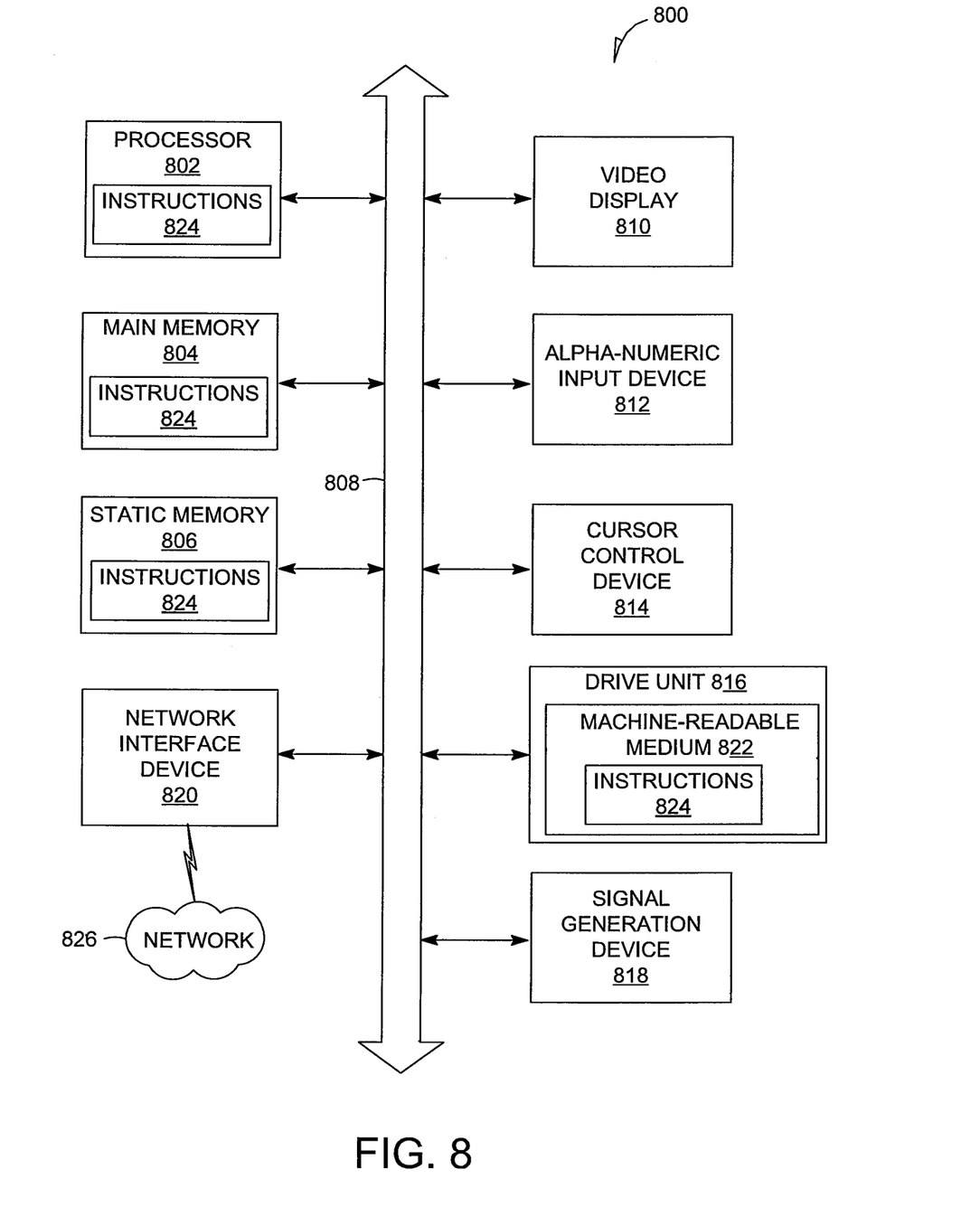
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alphanumeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Storage Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable storage medium 822 is shown in an exemplary embodiment to be a single medium, the term "machine-readable storage medium" may include a single storage medium or multiple media (e.g., a centralized or distributed database, or associated caches and servers) that store the one or more instructions. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving a data container, the data container including data saved to a master data system that is packed into the data container by a handler;
   determining at least one backup data system based on attributes of the data container;
   determining whether the at least one backup data system is available;
   based on the at least one backup data system being unavailable, buffering the received data container until the at least one backup data system becomes available;
   based on the at least one backup data system being available, forwarding the received data container to the at least one backup data system utilizing a system configuration of a plurality of system configurations, the plurality of system configurations being defined by dynamic objects that add configuration-specific information to one or more integration repository elements, the one or more integration repository elements comprising one or more static objects and one or more integration definitions that are maintained separate from functional application coding; and
   maintaining a log for each set of data transmitted to the master data system and a log for each data container forwarded to the at least one backup data system.

2. The method of claim 1, further comprising transmitting data to the master data system, the data being packed into the data container by the master data system.

3. The method of claim 2, wherein the transmitting of the data is based on a load-balancer URL.

4. The method of claim 1, wherein the log for each set of data transmitted and the log of each data container forwarded are monitored to insure that the master data system and the at least one backup data system are synchronized.

5. The method of claim 1, wherein the data container comprises attributes, the handler that is used to pack or unpack the data container being selected based on the attributes of the data container.

6. The method of claim 1, further comprising establishing a new class to cover a new process or application without having to define new interfaces or new routing rules in a generic framework.

7. The method of claim 1, wherein the data container comprises one or more of structured and unstructured data in a raw string format.

8. The method of claim 5, wherein the attribute used to select the handler comprises at least one of an object ID field, a description field, a priority field, a process type field, a process sub type field, or a customer field.

9. A system comprising:
   a processor of a machine;
   a communication engine to receive a data container, the data container including data saved to a master data system that is packed into the data container by a handler;
   an adaptation engine to determine, using the processor of the machine, at least one backup data system based on attributes of the data container and to determine whether the at least one backup data system is available;
   a buffer to buffer the received data container based on the at least one backup data system being unavailable, the communication engine to forward the received data container to the at least one backup data system based on the at least one backup data system being available utilizing a system configuration of a plurality of system configurations, the plurality of system configurations being defined by dynamic objects that add configuration-specific information to one or more integration repository elements, the one or more integration repository elements comprising one or more static objects and one or more integration definitions that are maintained separate from functional application coding; and
   a monitoring engine to maintain a log for each set of data transmitted to the master data system and a log for each data container forwarded to the at least one backup data system.

10. The system of claim 9, wherein the communication engine is further configured to transmit data from a user device to the master data system, the data being packed into the data container by the master data system.

11. The system of claim 10, wherein the transmitting of the data is based on a load-balancer URL.

12. The system of claim 9, wherein the monitoring engine insures that the master data system and the at least one backup data system are synchronized from the log of each set of data transmitted and the log for each data container forwarded.

13. The system of claim 9, further comprising an integration repository to design and develop interfaces, processes, and mapping objects used for integration and synchronization.

14. The system of claim 9, further comprising an integration directory to use dynamic objects to route the data container to the at least one backup data system.

15. A non-transitory machine-readable storage medium in communication with at least one processor, the machine-readable storage medium storing instructions which, when executed by the at least one processor, provide operations comprising:
   receiving a data container, the data container including data saved to a master data system that is packed into the data container by a handler;
   determining at least one backup data system based on attributes of the data container;
   determining whether the at least one backup data system is available;
   based on the at least one backup data system being unavailable, buffering the received data container until the at least one backup data system becomes available;
   based on the at least one backup data system being available, forwarding the received data container to the at least one backup data system utilizing a system configuration of a plurality of system configurations, the plurality of system configurations being defined by dynamic objects that add configuration-specific information to one or more integration repository elements, the one or more integration repository elements comprising one or more static objects and one or more integration definitions that are maintained separate from functional application coding; and
   maintaining a log for each set of data transmitted to the master data system and a log for each data container forwarded to the at least one backup data system.

16. The non-transitory machine-readable storage medium of claim 15, wherein the operations further comprise:
   insuring that the master data system and the at least one backup data system are synchronized from the log for each set of data transmitted and the log of each data container forwarded.

17. The non-transitory machine-readable storage medium of claim 15, wherein the data container comprises attributes, the handler that is used to pack or unpack the data container being selected based on the attributes of the data container.

18. The non-transitory machine-readable storage medium of claim 15, wherein the data container is transferred through at least one firewall.

19. The non-transitory machine-readable storage medium of claim 15, wherein the data container comprises one or more of structured and unstructured data in a raw string format.

\* \* \* \* \*